United States Patent

[11] 3,540,566

| [72] | Inventors | Charles B. Perry;<br>Kendall F. Bone, Cincinnati, Ohio |
|---|---|---|
| [21] | Appl. No. | 690,941 |
| [22] | Filed | Dec. 15, 1967 |
| [45] | Patented | Nov. 17, 1970 |
| [73] | Assignee | Cincinnati Milacron Inc.<br>Cincinnati, Ohio<br>a corporation of Ohio |

[54] CONNECTOR SYSTEM
9 Claims, 11 Drawing Figs.

[52] U.S. Cl. .................................................. 198/19,
198/33
[51] Int. Cl. .................................................. B23q 5/22,
B65g 47/24
[50] Field of Search .......................................... 198/19,
33(R2); 269/56; 214/1R; 83/Inq

[56] References Cited
UNITED STATES PATENTS

| 2,802,561 | 8/1957 | Juvinall | 198/33(R2) |
| 3,297,132 | 1/1967 | Ripple | 198/33(R2) |

Primary Examiner—Edward A. Sroka
Attorney—Norman S. Blodgett

ABSTRACT: This invention has to do with a connector system and, more particularly, to means for accurately locating a body in all physical dimensions in selective angular spaced relation to another with an initial application in manufacturing field of endeavor including but not limited to the location of work stations of multiple workpieces relative to machine frames or multiple tools and machine attachments relative to the work station spindle or support.

Patented Nov. 17, 1970

CHARLES B. PERRY
KENDALL F. BONE
INVENTORS.

BY

Patented Nov. 17, 1970

3,540,566

CONNECTOR SYSTEM

BACKGROUND OF THE INVENTION

There are occasions in the manufacture of products by the machining of a workpiece when it is desirable to locate a workpiece, a tool, or a similar element in accurate relationship to a work station. This need is particularly felt in an arrangement of the type shown and described in the U.S. Pat. application of Carl Perry et al. Ser. No. 690,940 filed Dec. 15, 1967, and entitled MANUFACTURING SYSTEM; in that system it is important that an accurate connection be made between any one of a number of workpieces and any one of a number of work stations. In such a system it is also important that any one of a number of tools may accurately be joined to a given work station. Attempts to provide such a connection in the past have been feasible only for one or two axis orientation where nominal accuracy requirements were acceptable. But such systems are not satisfactory for applications requiring high accuracy and multiple angular orientations of workpieces to work stations. Also in some instances such systems provided inadequate stiffness of the mechanical couple. The use of tapered pegs on one element to mate with similar tapered bores in another element to which it was to be joined would not result in highly accurate relative location of the two elements, particularly when the joining action must take place repeatedly and indiscriminately between a large number of different elements; the wearing with accompanying maintenance problems as well as shortcomings in high cost and accuracy limitations of the pegs result in poor repeatability of location. The same problem of poor repeatability occurs with the use of a tongue-and-groove connection and other well-known coupling types. Even if locators for replaceable sleeves and pin guides are jig ground, the cumulative registration error achieved would result in only an accuracy in an order of plus or minus .003 which would be difficult to maintain for multiple stations, pallets and angular orientation varying from machine to machine. These and other difficulties experienced with the prior art devices are avoided in a novel manner by the present invention.

It is, therefore, an object of the invention to provide a connector system having a higher magnitude of accuracy with major reduction in maintenance costs and including a connector for accurately locating pairs of elements in the system to each other.

Another object of this invention is the provision of a connector for use in a manufacturing system which will not lose accuracy of location with repeated use.

A further object of the present invention is the provision of a connector for use with work stations and machine tools which is simple in construction, easy and inexpensive to manufacture, and which is capable of a long life with useful service and a minimum of maintenance.

A still further object of the invention is the provision of a coupling for joining a workpiece or a tool to a work station so that a high degree of accuracy of relationship is obtained axially, laterally and angularly.

It is a further object of the invention to provide a coupling in which the primary junction between two elements may take place at any one of a large number of angular relationships.

It is a still further object of the present invention to provide a coupling in which the geometric relationship between the elements to be joined is not adversely affected by forces used to lock the coupling parts together.

Another object of this invention is to improve stiffness and rigidity in axial, radial as well as torsional aspects in conjunction with high accuracy in a connector system which permits random mating of components. Random mating refers to the fact that a particular half of a mating couple may be mated with a large number of corresponding couples.

Another object of this invention is to provide a connector system that facilitates pressing together two bodies and maintenance of projections in close engagement by pressure application means at least in localized areas of projection engagement to prevent distortion of the bodies.

Further objects and advantages of the present invention will be apparent from the following description, reference being had to the accompanying drawings wherein an embodiment of the present invention is clearly shown.

In general, the invention comprises a connector system which includes a conveyor for workpieces, an incoming section located at one side of a work station, an outgoing section located at the other side of the work station, an intermediate section extending between the incoming section and the outgoing section, means removing the intermediate section from the workpiece while an operation is performed on the workpiece, a first body associated with the workpiece, a second body associated with the work station, a predetermined array of projections mounted on the first body and extending at least in part toward the second body, and a predetermined array of projections mounted on the second body and extending at least in part toward the first body, the two arrays being of complementary form to bring about an accurate location of the first body relative to the second body with regard to concentricity of the arrays and stacked thickness of the bodies. The invention also includes means to press the two bodies together to maintain the projections in close engagement, the said means being operative in the areas of projection engagement to prevent distortion of the bodies.

BRIEF DESCRIPTION OF THE DRAWINGS

The character of the invention, however, may be best understood by reference to one of its structural forms, as illustrated by the accompanying drawings, in which.

DESCRIPTION OF AN EMBODIMENT OF THE PRESENT INVENTION

It is obvious that minor changes may be made in the form and construction of the invention without departing from the material spirit thereof.

Figure 1:
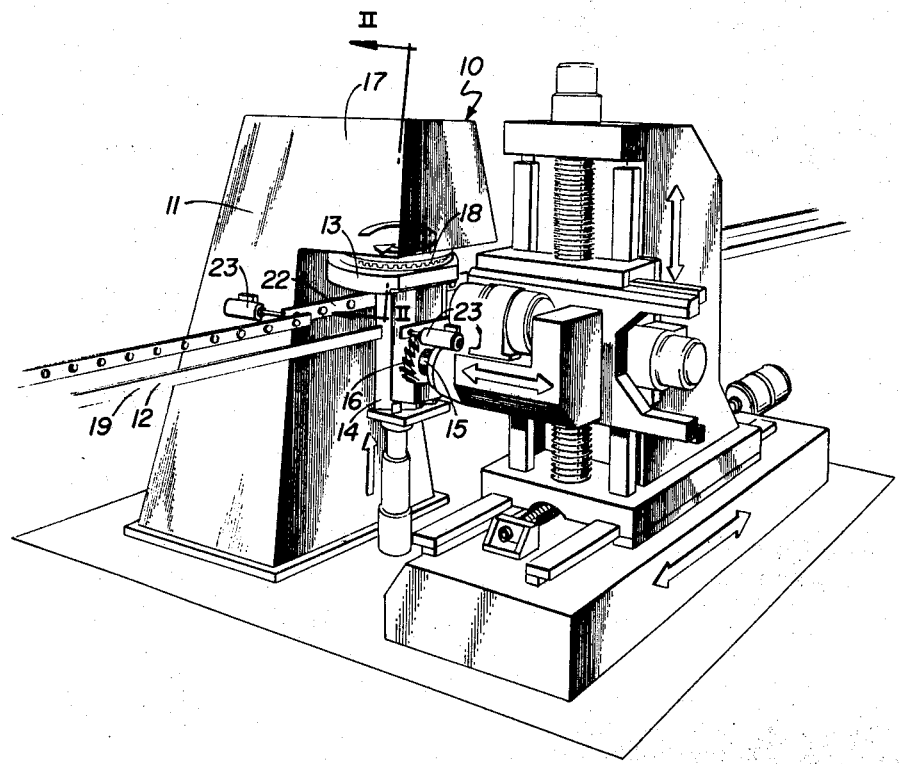
FIG. 1 is a somewhat schematic perspective view of a manufacturing system embodying the principles of the present invention.

Referring first to FIG. 1, which best shows the general features of the invention, the connector system, indicated generally by the reference numeral 10, is shown as comprising a machine tool 11 associated with a conveyor 12 which carries to it a fixture or pallet 13 on which is fastened in downwardly-depending fashion a workpiece 14. The machine tool 11 is one of many joined by the conveyor 12 to form a manufacturing system of the type shown and described in the patent application of Carl Perry et al. mentioned above.

The machine tool is shown, for the purpose of illustration, as a horizontal 3-axis sliding-carrier machine having a rotatable spindle 15 capable of adjustment both vertically, and horizontally parallel and perpendicular to the machine tool axes and carrying a tool 16 which is to perform a machining operation on the workpiece 14. The machine tool is provided with an abutment 17 which extends over the conveyor 12 and is adapted to be joined on occasion to the fixture or pallet 13 or to the workpiece by a connector 18. The conveyor 12 is shown schematically in FIG. 1 and is made up of an incoming section 19 and an outgoing section between which lies an intermediate section 22, such as the cylinders 23. Means are provided to remove the intermediate section 22 from the work area once the fixture or pallet and workpiece are joined to the machine tool by the connector.

Figure 2:
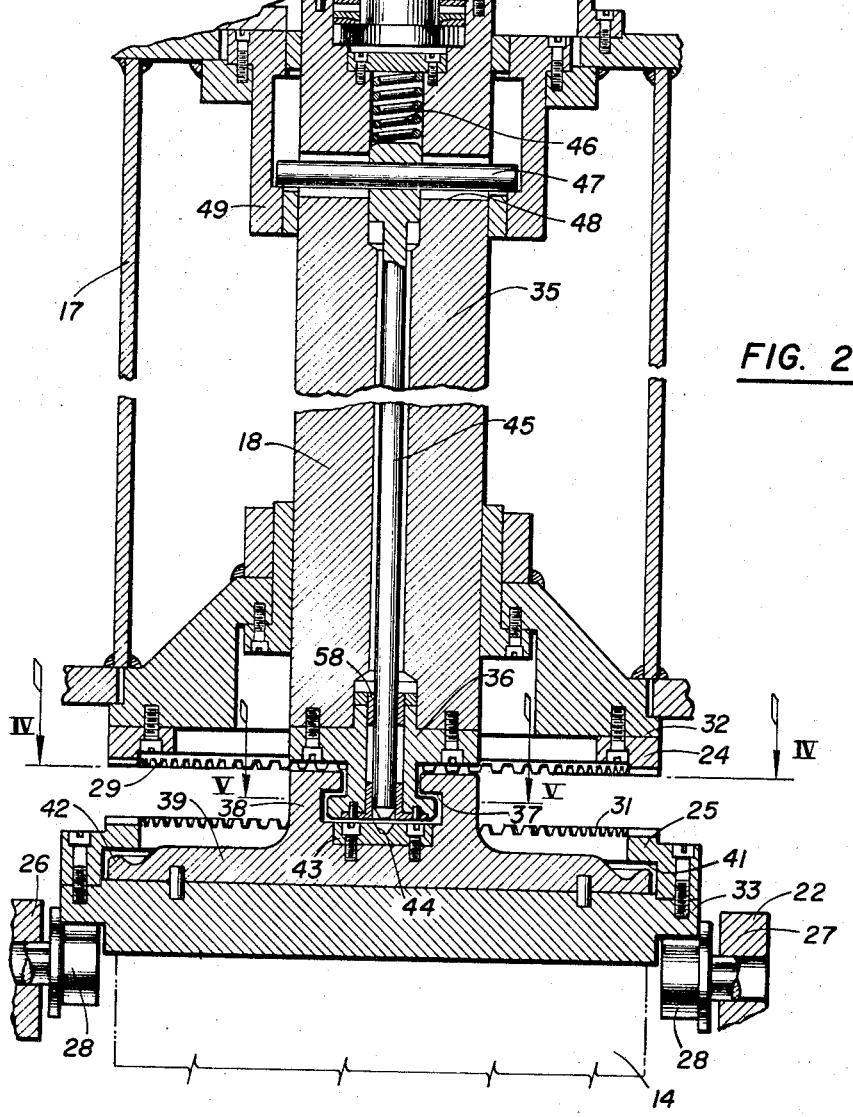
FIG. 2 is a vertical-sectional view of the system taken on the line II–II of FIG. 1.

Referring next to FIG. 2, the connector 18 is shown in the condition that exists when the fixture or pallet 13 and the workpiece 14 underlie the abutment 17 of the machine tool, but are still supported on the intermediate section 22 of the conveyor. The connector consists of a first body 24 attached to the machine tool and a second body 25 mounted on the fixture or pallet. In this connection it should be noted that, although the pallet 13, the workpiece 14, and the second body 25 are shown as separate members which are fastened together, it is contemplated that two or more thereof may be integral with one another. Thus the pallet and fixture, workpiece and pallet or workpiece and fixture could be integral. Also the pallet can be replaced entirely by fixture or even by having the second body directly with a workpiece as illustrated in copending application of Perry, Ser. No. 690,940 filed Dec. 15, 1967.

Thus stiffness, accuracy and lower cost can be achieved in a manner not possible with locating pins of a type previously known.

As shown the conveyor includes two parallel beams 26 and 27 on the inner facing surfaces of which are rotatably mounted rollers 28. A rabbet or wear strip is formed along the edge of the pallet or fixture for contact with and guidance by the rollers. A circular array of substantially radial projections 29 is mounted on the first body 24 and extends at least in part toward the second body 25. A circular array of substantially radial projections 31 are mounted on the second body 25 and extend at least in part toward the first body. The two arrays of projections are of complementary form to permit an accurate location of the first body relative to the second body with regard to concentricity, angular orientation and stacked thickness of the bodies. Each of the bodies 24 and 25 is provided with a reference surface 32 and 33, respectively, from which its array extends, the reference surfaces being accurately located in spaced, parallel relationship when the projections are tightly meshed.

Mounted at the upper side of the abutment 17 is a linear actuator such as a cylinder 32C whose piston rod 33P is connected to the upper end of a lock shaft 34. The lower end of the lock shaft 34 is connected to the upper end of a cylindrical bar 35 by means of an antifriction thrust bearing that permits free rotation of bar 35 without corresponding motion of shaft or plunger 34. The lower end of bar 35 is provided with a T-head 36 adapted to slide into a T-slot 37 formed in a boss 38 extending upwardly from the center of a flat disk or slightly deformable diaphragm 39. The periphery of the disk or diaphragm 39 lies in an annular rabbet 41 formed in the second body 25. The upper surface of the disk or diaphragm at the periphery is formed with an annular ridge 42 adapted to engage the downwardly-directed horizontal surface of the rabbet 41, the point of engagement being below the geometric center of the projections 31. In general, the cylinder 32 acts to press the two bodies 24 and 25 together to maintain the projections in close engagement, the forces being operative at least in localized areas of projection engagement to prevent distortion of the bodies.

In order to give initial rough centering and angular orientation of the bodies 24 and 25, a hardened-metal plate 43 is embedded in the bottom of the T-slot 37 and the plate is provided with an upwardly-directed tapered polygon recess 44. A rod 45 with a shaped and tapered polygon lower end extends axially through the bar 35 and the T-head 36. It is biased downwardly by a coil spring 46 pressing on its upper end. A rod 47 extends transversely through its upper end, passes through an axially-elongated transverse bore 48 into a housing 49 mounted in the abutment 17. To the upper end of the rod 35 is fastened a pinion gear 51 to which is connected a drive motor 52 to rotate the bodies about a vertical axis. The motor may be of the type shown and described in the application of Perry and Bone, Ser. No. 690,948, filed Dec. 15, 1967.

Figure 3:
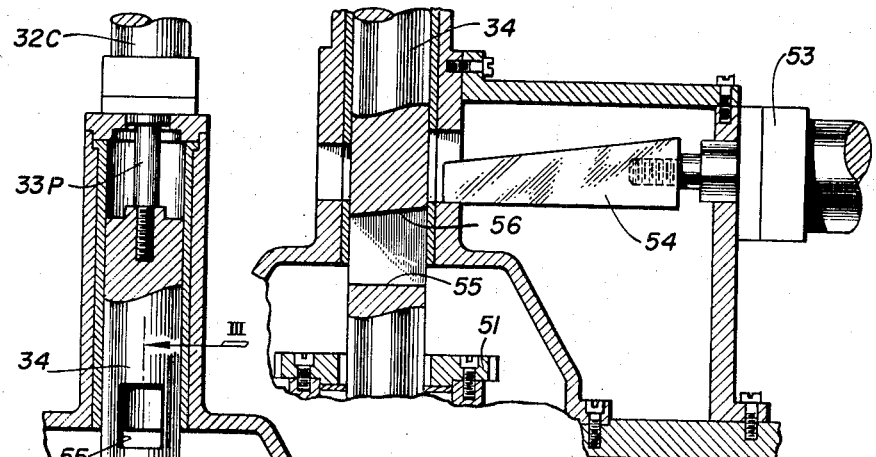
FIG. 3 is a vertical-sectional view of the system taken on the line III–III of FIG. 2.

In order to provide a positive lock between the two bodies, the apparatus shown in FIG. 3 is provided. A cylinder and piston assembly 53 has a wedge 54 fastened to its piston rod and the lock shaft 34 is provided with a transverse passage 55 having an upper surface 56 which is inclined to the axis of the cylinder and piston assembly 53 so as to be complementary to the upper surface of the wedge.

Figure 4:
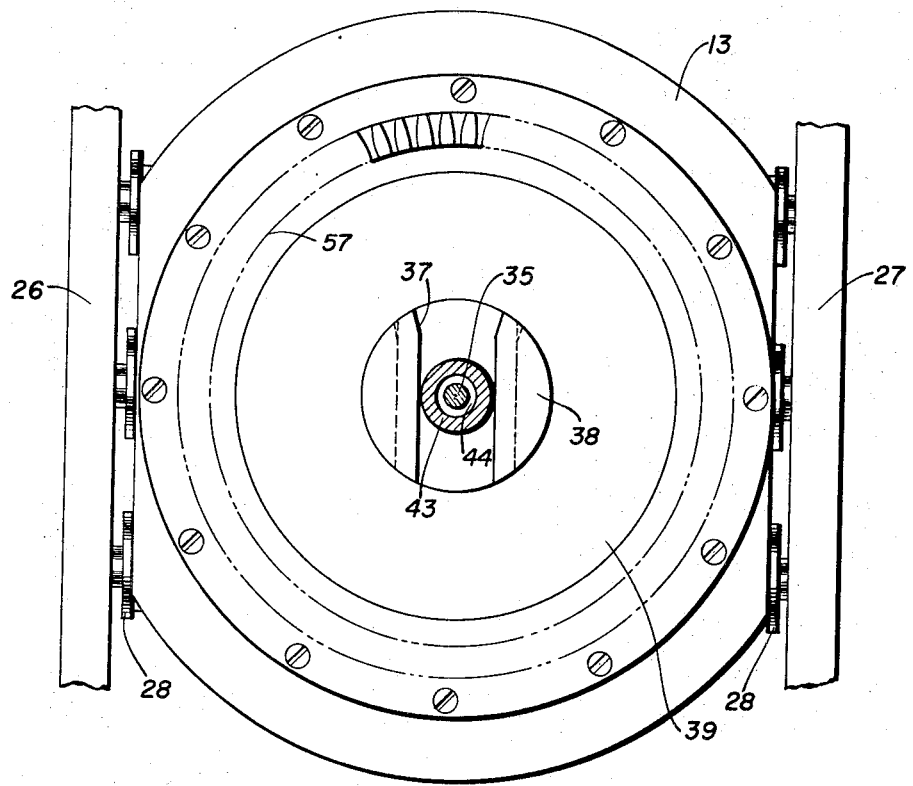
FIG. 4 is a horizontal-sectional view taken on the line IV–IV of FIG. 2.

FIG. 4 shows the plan view of lower or second body 25 with the first body 24 removed. It can be seen that the projections 31 are arranged in a circular array and are formed as radial teeth. It should be noted that the entrance sides of the T-slot 37 are beveled to facilitate the entrance of the T-head 36. An imaginary circle 57 joins the geometric centers of the projections and it is below this line that the ridge 42 engages the body 25 to press it upwardly against the body 24.

Figure 5:
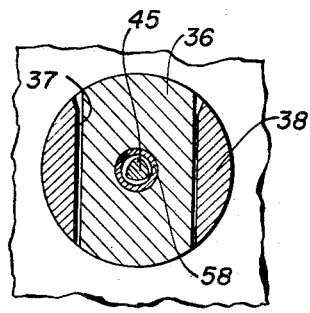
FIG. 5 is a horizontal-sectional view taken on the line V–V of FIG. 2.

FIG. 5 shows the T-head 36 residing in the T-slot 37. It also shows a restraining polygon-shaped flanged bushing 58 which guides the lower end of the rod 45.

Figure 6:
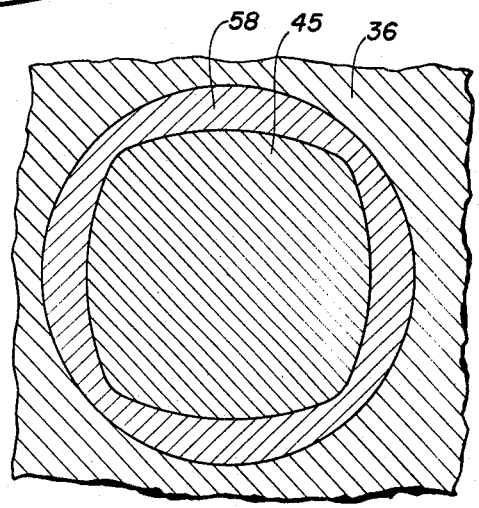
FIG. 6 is an enlarged view of the center portion of FIG. 5.

In FIG. 6, the lower end of the rod 45 is shown as being a fourlobed shape polygonal in cross section and tapered to a reduced cross section extreme lower end of the rod. Above this tapered section the rod has a torque restraining or other suitable splined or polygon configuration.

The operation of the system will now be readily understood in view of the above description. The pallet 13 with its dependent workpiece 14 arrives along the incoming section 19 of the conveyor 12. It progresses onto the intermediate section 22 and stops in the position shown in FIG. 1; in reaching this position, the T-slot 37 has moved onto the T-head 36 and the point of rest is such that the recess 44 associated with the second body 25 is in approximate alignment with the rod 45 associated with the first body 24. The cylinder 32C is then energized, thus drawing the piston rod 33P upwardly and carrying with it the lock shaft 34, the bar 35, and the T-head 36. The upward movement of the T-head operates on the T-slot 37 and the boss 38 to draw the disk 39 upwardly. The ridge 42 contacts the surface of the rabbet 41 in the second body and carries the pallet and the workpiece in an upward direction. The weight of the pallet and the workpiece is removed from the rollers 28 of the conveyor and it is then possible, by means of the cylinders 23 to remove the intermediate section 22 from the work area so that the spindle 15 and the tool 16 can be moved to any necessary position relative to the workpiece.

Further operation of the cylinder 32C brings about engagement of the bottom end of the rod 45 with the recess 44. If these elements are out of alignment, the camming action between them will cause a lateral shifting and an angular orientation between the disk 39 and the second body 25 and, therefore, between the first body 24 and the second body 25. Penetration of the rod into the recess brings about a rough alignment of the two bodies. The second body 25 is then rotated to a desired angular position by the motor 52 operating through a transmission 50. Further operation of the cylinder 32C brings about engagement of the projections 29 with the projections 31; since the projections are formed to be complementary, their engagement will bring about very accurate alignment of the two bodies. This accuracy is well within the tolerances demanded of present day machining operations. In addition to accuracy of alignment, the engagement of the complementary surfaces of the projections brings about very accurate spacing and parallelism between the surfaces 32 and 33 and, therefore, between the bodies. This is the condition of the elements shown in FIG. 7.

If the last bit of relative vertical movement and sliding engagement between the projections causes lateral adjustment between the rough position of the bodies and the finish position, this movement is made possible by the movement of the disk or diaphragm 39 within the second body. So far as the rod 45 is concerned, at the final stage of vertical movement of the bodies it has reached the bottom of the recess 44 and has moved upwardly relative to the bar 35 against the pressure of the spring 46. Lateral movement of the second body 25 during the last stages of engagement between the projections will cause the rod to crowd to one side or the other of the recess.

Figures 7, 8, 9, 10:
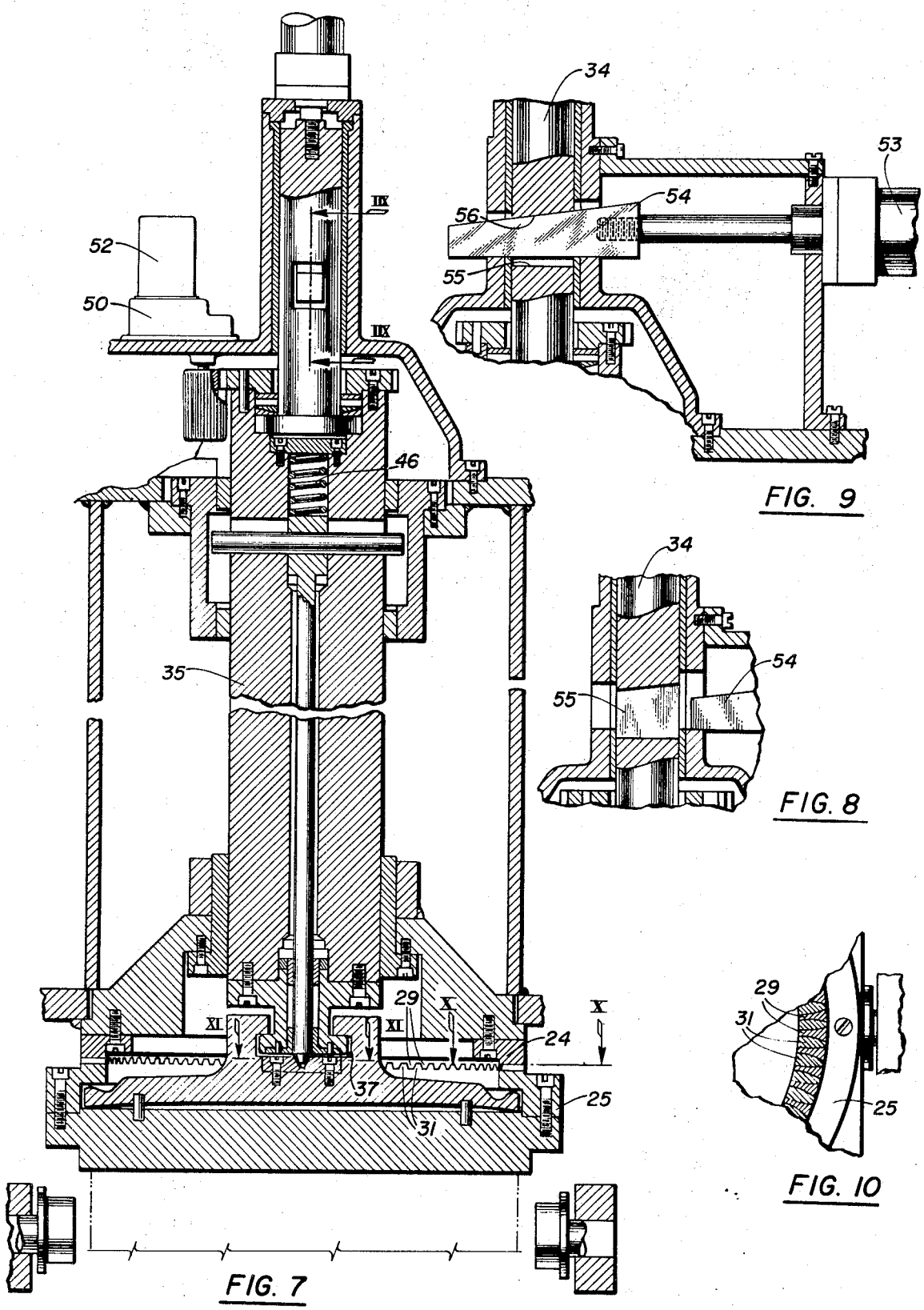
FIG. 7 shows the apparatus of FIG. 2 in another condition.
FIG. 8 shows the apparatus of FIG. 3 in a second condition.
FIG. 9 shows the apparatus of FIG. 3 in a third condition.
FIG. 10 is a horizontal-sectional view taken on the line X–X of FIG. 7.

Once the bodies have been accurately registered relative to one another, it is necessary to lock them together to insure against disengagement or accidental movement, for instance, by failure of fluid pressure at the cylinder 32C or the application of machining forces. Now, the wedge 54 is normally out of alignment with the passage 55, as is obvious from an inspection of FIG. 3. However, when the elements have been moved together by the cylinder 32C and the projections are in complete meshing engagement, as shown in FIG. 7, the passage 55 has been raised to the point where it lies opposite the end of the wedge, as shown in FIG. 8. Energization of the cylinder and piston assembly 53 causes the wedge to advance laterally, engage the inclined surface 56, and stops at a position of travel such that a predetermined force is brought to bear between the complementary surfaces of the projections on the two bodies. As is evident in FIG. 9, the wedge not only extends through the passage 55 in the lock shaft 34, but also through rectilinear apertures formed in the wall of the housing which carries the lock shaft. In this way, the wedge is supported on the lower edges of the apertures while carrying the load from the lock shaft on its upper inclined surface.

Figure 11:
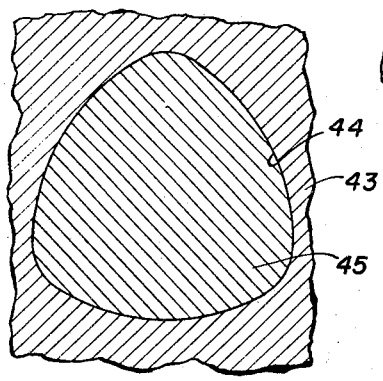
FIG. 11 is a horizontal-sectional view taken on the line XI–XI of FIG. 7.

FIG. 11 shows the relationship between the recess 44 in the plate 43 and the lower end of the rod 45 when the elements of the connector are in the final condition shown in FIG. 7. Both the recess and the lower end of the rod are formed with a tapered, threelobe form. It will be understood that the form used could be selected from many tapered polygonal shapes. Although the drawing shows complete engagement between all surfaces of the rod and recess, it should be understood also that, if the final sliding and mating engagement of the projections results in a slight lateral adjustment of the second body 25, the fit between the disk and the second body will permit such adjustment.

FIG. 10 shows in detail the nature of the final engagement of the projections 29 and 31. In one embodiment, the projections are in the nature of radial teeth of the type shown and described in the Wildhaber Pat. 2,384,582. In plan view the projections 31 are generally lozenge-shaped with narrow ends and relatively large center portions extending generally radially with substantially flat ends and arcuate shaped flanks. The projections 29 are similar, but have concave sides instead of convex. When the radial teeth or projections are pressed together, any misalignment of centerlines of the two bodies will be corrected by lateral sliding and angular orientation action. In final position, the pitch lines of the sides of the teeth are coincidental to provide exact location in the axial direction. This manner of locating the bodies relative to each other results in excellent repeatability, because so many hardened surfaces are involved in the engagement that very little wear on any one surface takes place. Furthermore, no matter what the aspect of the second body is relative to the first body, the engagement of the teeth will produce a small relative rotation to a predetermined angular relationship.

With the second body 25 accurately located relative to the first body 24, the workpiece 14 is also accurately positioned in a predetermined manner relative to the machine tool 11 and its spindle 15 and tool 16. This location is accurate with regard to vertical position, angular position about the axis of the bar 35, and all other rectilinear and angular aspects. By adjusting the spindle 15 up-and-down or sideways and feeding it longitudinally and by rotating the workpiece to predetermined angular positions by means of the motor 52, it is possible to perform various machining operations on the workpiece in the usual way. These positions and the machining operations can be automatically regulated by numerical control equipment. In that case, the accuracy of the finished machined surface is dependent on the initial accuracy of location of the second body 25 relative to the first body 24; the present invention permits this accuracy of location to well within the tolerances necessary in production machining. It is clear that when a machining system is used which includes a number of machine tools each of which is provided with a first body 24 and a variety of pallet, fixture and workpiece combinations is carried through the system by the conveyor, if each pallet or fixture is provided with a second body 25, any workpiece can be located accurately relative to any machine tool. This means that successive machining operations can be performed on a given workpiece by a succession of machine tools with the necessary accuracy of the successive machining operations. Since the accurate location of a given workpiece relative to successive machine tools is brought about automatically and without the intervention of a human operator, it is possible to control not only the individual machine tools automatically by numerical control means but also the progress of the workpiece to a succession of machine tools. It is possible to visualize the provision of a completely automatic factory by the incorporation of the present invention.

In like manner, it is to be understood that features of the present invention are applicable to work station and other assembly, inspection or similar processing operations where transfer handling and accurate rigid multiple registration is required.

We claim:
1. A connector system, comprising:
   a. a conveyor for workpieces;
   b. an incoming section located at one side of a work station;
   c. an outgoing section located at the other side of the work station;
   d. an intermediate section extending between the incoming section and the outgoing section;
   e. means separating the intermediate section and the workpiece while an operation is performed on the workpiece;
   f. a first body associated with the workpiece;
   g. a second body associated with the work station;
   h. a predetermined array of projections mounted on the first body and extending at least in part toward the second body; and
   i. a predetermined array of projections mounted on the second body and extending at least in part toward the first body, the two arrays of projections being of complementary form to bring about an accurate location of the first body relative to the second body with regard to concentricity, angular orientation and stacked thickness of the bodies.

2. The connector system of claim 1, wherein means is provided to press the two bodies together to maintain the projections in close engagement, the said means being operative at least in localized areas of projection engagement to prevent distortion of the bodies.

3. The connector system of claim 1, wherein the projections are radial teeth, each tooth associated with the other body having predetermined flanks and each tooth associated with the other body having flanks complementary thereto, each of the flanks of each tooth engaging a flank of a tooth of the other body.

4. In a connector system, a conveyor for workpieces, comprising:
   a. an incoming section located at one side of a work station having an operative element;
   b. an outgoing section located at the other side of the work station;
   c. an intermediate section extending between the incoming section and the outgoing section; and
   d. means removing the intermediate section from the workpiece while the operative element of the work station is performing an operation on the workpiece.

5. In a connector system, a conveyor as recited in claim 4, wherein means is provided to connect the workpiece to the work station during the operation and to rotate the workpiece about a vertical axis to a predetermined angular relationship to the operative element.

6. In a connector system, a connector comprising:
   a. a first body;
   b. a second body;

c. a predetermined array of projections mounted on the first body and extending at least in part toward the second body;
d. a predetermined array of projections mounted on the second body and extending at least in part toward the first body, the two arrays of projections being of complementary form to permit an accurate location of the first body relative to the second body with regard to concentricity, angular orientation and stacked thickness of the bodies, each body being provided with a reference surface from which its array extends, the reference surfaces being accurately located in spaced parallel relationship when the projections are tightly meshed; and
e. means to press the two bodies together to maintain the projections in close engagement, the said means being operative at least in localized areas of projection engagement to prevent distortion of the bodies, said means comprising a rod slidably mounted in the said first body and having a T-head located adjacent the second body, a disc mounted in the second body and having a central boss formed with a T-slot adapted to engage the said T-head, the second body being of annular shape and formed with a rabbet facing inwardly axially behind the array of projections, the periphery of the disc residing in the rabbet and having an annular ridge which presses against the surface of the rabbet behind the geometric centers of the projections, so that forces acting between the T-head and the T-slot to draw the bodies and the projections together do not distort the bodies.

7. A connector system as recited in claim 6, wherein a rough locating means is provided between the bodies consisting of a rod slidably mounted in the bar of the first body and spring-urged toward the second body and a recess formed in the second body to receive the end of the bar, the recess and the end of the bar being formed with tapered polygonal shapes of the same size.

8. In a connector system, a connector comprising:
a. a first body;
b. a second body;
c. a predetermined circular array of projections mounted on the first body and extending at least in part toward the second body;
d. a predetermined circular array of projections mounted on the second body and extending at least in part toward the first body, the two arrays of projections being of complementary form to permit an accurate location of the first body relative to the second body with regard to concentricity, angular orientation and stacked thickness of the bodies, each body being provided with a reference surface from which its array extends, the reference surfaces being accurately located in spaced parallel relationship when the projections are tightly meshed; and
e. means to press the two bodies together to maintain the projections in close engagement, the said means being operative at least in localized areas of projection engagement to prevent distortion of the bodies, the projections being radial teeth, each tooth associated with one body having arcuate flanks and each tooth associated with the other body having complementary flanks, each of the flanks of each tooth engaging a flank of a tooth of the other body.

9. A connector as recited in claim 8, wherein said means to press the two bodies together consists of a diaphragm actuated in its center from one body and having an annular ridge contacting an area of the other body located between the outer and inner extremes of the array of teeth so that it produces a symmetrical distribution of clamping force over the contacting areas of the teeth and so that no appreciable bending force is applied to the said other body.